Feb. 9, 1971            D. L. STRAUSS            3,562,051
METHOD OF MAKING A DECORATIVE MOLDED CONTOURED
BODY OF POLYVINYL CHLORIDE
Filed Oct. 11, 1968            2 Sheets-Sheet 1

INVENTOR
DAVID STRAUSS

BY *Dick M Warburton*

ATTORNEY

INVENTOR
DAVID STRAUSS

BY *Dick M. Warburton*

ATTORNEY

United States Patent Office 3,562,051
Patented Feb. 9, 1971

3,562,051
METHOD OF MAKING A DECORATIVE MOLDED CONTOURED BODY OF POLYVINYL CHLORIDE
David L. Strauss, Fair Lawn, N.J., assignor to Harte & Company, Inc., New York, N.Y., a corporation of New York
Continuation-in-part of abandoned application Ser. No. 687,005, Nov. 30, 1967. This application Oct. 11, 1968, Ser. No. 772,454
Int. Cl. B31f 7/00
U.S. Cl. 156—219                    6 Claims

ABSTRACT OF THE DISCLOSURE

The invention relates to a method of making a decorative, hot-pressed molded, contoured body of poly(vinyl chloride) in mat-like form, by means of a series of sequential steps in which a mass of highly plasticized poly(vinyl chloride) is shaped in a cavity mold, cooled, and thereafter while the shaped mass is still retained in one-half of the cavity mold a printed film of poly(vinyl chloride) is applied to the exposed surface so that the printed surface of the film is ultimately visible as the decorative element of the molded form. In this regard, the printed surface of the film may be applied as the exposed wear surface of the article, or a "reverse" printed film may be applied with the printed surface pressed into the main body of the article, or the printed surface of the poly(vinyl chloride) film may be pressed into the backing surface of the article opposite the wear surface, in the event that the main body of the article is transparent, unfilled, poly(vinyl chloride), so that the printed surface of the film is also visible through the main body of the article.

---

This application is a continuation-in-part of my application Ser. No. 687,005 filed Nov. 30, 1967, now abandoned.

BACKGROUND OF THE INVENTION

Many types of molded laminated articles in mat-like form composed of poly(vinyl chloride), either in transparent form, or opaque form, such as floor coverings, tiles, wall coverings and the like have heretofore been proposed in many and varied assemblies and compositions, as well as methods by which the laminae may be brought together to form a unitary structure.

One such article and method proposed consists in taking a series of calendered sheets of poly(vinyl chloride), the top sheet or wear sheet being clear to translucent in its optical properties, a lower intermediary strip or sheet of pigmented or plasticized poly(vinyl chloride), on the surface of which is a printed design, this is followed by a series of backing sheets of pigmented and plasticized poly(vinyl chloride), and the whole assemblage subjected to heating to a temperature of about 290° F., to 320° F., under a pressure of about 65 pounds per square inch.

Another such structure and method consisting in forming a poly(vinyl chloride) plate or sheet containing a relatively large amount of softener, the forming being on rolls such as calender rolls and combining this with a film, also formed on rolls, containing little or no plasticizer, and the two layers pressed together at an elevated temperature under pressure in a press, or on rollers, or the like, the film containing little or no softener acting as a blocking agent for the layer rich in plasticizer, whereby migration of the plasticizer is blocked and the exposed surface of the film is suited for being semented to a shoe undersole.

Each of these methods, as well as others disclosed in the prior art, may also provide for applying poly(vinyl chloride) lacquers or cements to one or both of the surfaces to be joined to form the lamination.

More recently it has been proposed in the prior art to provide a floor, or wall covering of the hard surface type with a decorative layer incorporated in the body of the article protected by a clear, transparent, wear resistant film or coating, by combining a plurality of calendered poly(vinyl chloride) sheets, the upper most of which is transparent with one surface reverse printed with a decorative pattern, the printed surface subsequently being pressed in contact with the lower highly pigmented sheets of the laminate.

One draw-back to the use of calendered sheets in forming the laminate is that by the very nature of the calendering process the sheets of the laminate as well as the finally formed laminated body must be stress-relieved, if the article is to retain its original shape in use. Such stress relieving of each of the calendered sheets as well as the laminated article involves additional heating steps while the sheet or the laminated article is in a relaxed condition and subjected to the heat treatment.

THE PRESENT INVENTION

It has now been found that a decorative molded contoured body of poly(vinyl chloride) in mat-like form, which need not be stress-relieved and which retains its shape in use is easily obtained by a series of sequential steps which include (1) hot-press molding a mass of relatively highly plasticized poly(vinyl chloride) in a mat-like form cavity mold having a pair of separable, heated, cavity forming members, the temperature, dwell time, and pressure during said molding being sufficient to heat said mass to flowable, semi-solid state, and to fill the cavity of said mold, (2) cooling the molded mass, (3) releasing the pressure upon said mass by withdrawing one of said cavity-forming members and retaining the molded mass within the second of said cavity forming members, (4) and while said mass is retained in the second cavity-forming member, applying to the exposed surface of said molded mass, a printed film of poly(vinyl chloride) of lesser plasticizer content than said molded mass, in such a manner that the printed surface of said film is ultimately visible as the decorative element of the resulting article, (5) replacing the withdrawn cavity-forming member upon said film, (6) applying heat and pressure to the film and molded mass while in said cavity mold at a temperature and pressure sufficient to press said film into the surface of said molded mass and firmly bond said film thereto, (7) cooling the thus-formed laminated article in said mold to a temperature below that at which said film is pressed into the surface of said mass, and (8) removing said laminated article from said mold.

The invention is also directed to the various articles obtainable by the above-described method examples of which include mats and articles of like form, such as floor mats for automobiles, and molded house wares such as bath mats, placements, fatigue mats, drainboards, sink mats, shelf coverings and the like. Such articles may have a relatively highly plasticized mass of pigmented poly(vinyl chloride) with the printed surface of the film forming the upper or wear surface, or the film may be reverse printed and the printed surface of the film pressed into the main body of the article, for example, as in bath mats having surface-adhering suction cups or the like protuberances on the lower surface for preventing slippage in contact with a wet surface during in-use service. Other articles which may be more massive and obtainable by the above-described method include car floor mats having a clear main body of highly plasticized poly(vinyl chloride) presenting the upper or wear surface with the printed surface of the poly(vinyl chloride) film pressed into the lower surface whereby a "see through" effect is obtained with the printed surface of the film again forming the decorative element. In this manner, improved results are achieved with surprising simplicity of both form and the method of making the articles.

In order that those skilled in the art may better understand the principles of the present invention as to the method and product, reference may be made to the attached drawings, as well as to the following brief description in connection therewith, and to the specific examples of formulations and specific conditions which may be employed in the manufacture of the articles of the present invention.

Referring now to the drawings.

Figure 1:
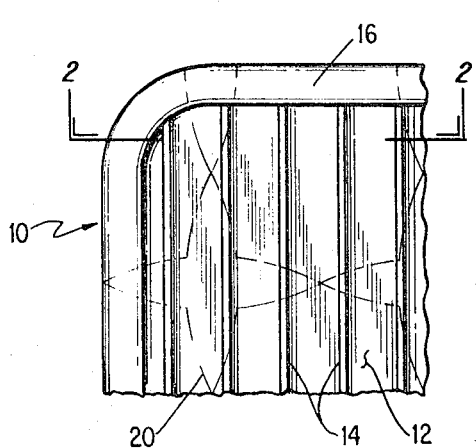
FIG. 1 shows a partial plane view of a mat made in accordance with the present invention, showing a top, relatively thick, layer of highly plasticized transparent poly(vinyl chloride), and a printed film of poly(vinyl chloride) bonded thereto, in accordance with the present invention.
Figure 2:
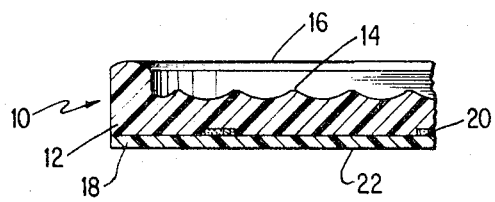
FIG. 2 represents a diagrammatic showing of a vertical cross-section along the lines 2—2 of FIG. 1 viewed in the direction of the arrows, showing the 2-ply laminate in detail, exaggerated for clarity.

In the drawings, the mat form of the figures is generally represented by 10, and in FIGS. 1 and 2 the upper, thicker layer of the mat is represented by 12, which has a series of corrugations 14 extending longitudinally of the mat surface forming a contoured wear surface thereon, and a marginal ridge 16, forming the outline of the contoured body, with the printed poly(vinyl chloride) film 18 bonded to the lower or back surface of the clear highly plasticized poly(vinyl chloride) upper layer 12, with the printed surface 20 of the film pressed into the lower or back surface of the upper layer leaving the unprinted surface 22, on the support-contacting side of the laminates structure.

Such a mat molded of the materials prescribed and in the manner to be described herein, has the decorative surface 20 of the film 18 visible through the clear, transparent, highly plasticized poly(vinyl chloride), much thicker layer 12, super-imposed thereon so that the decorative effect is one of the so-called "see through" type and would be used for a mat or the like article which would ordinarily be used in heavy duty service such as in the floor mat of an automobile, the printed surface of the poly (vinyl chloride) film preferably being in color harmony with that of the interior and exterior decor of the vehicle in which it is used.

Figure 3:
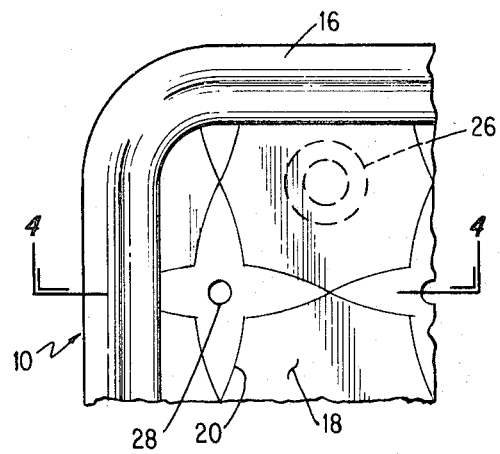
FIG. 3 is a diagrammatic representation in plan view of a mat-like form in accordance with the present invention, wherein the relatively thick layer of highly plasticized poly(vinyl chloride) contains opacifying pigments, and fillers, and the printed film of poly(vinyl chloride) is bonded to the upper or wear surface.
Figure 4:
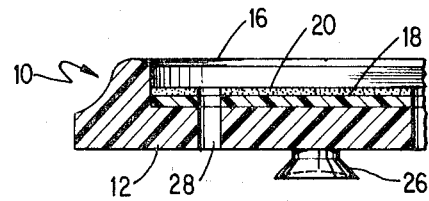
FIG. 4 is a vertical cross-section along the lines 4—4 of FIG. 3, showing the detail of the 2-ply laminate, also exaggerated for clarity.

Molded articles of the type used in less severe service, in accordance with the present invention such as a bath mat or shower stall mat, diagrammatically represented in FIGS. 3 and 4 may be made in accordance with present invention. The main body of the laminated article is also represented generally at 10 with the poly(vinyl chloride) film 18 bonded to the filled, pigmented, highly plasticized, much thicker layer 12 of poly(vinyl chloride), in such a manner that the unprinted surface 22 of the film 18 is pressed into and bonded with the thicker layer 12 with the printed surface 20 of the film 18 exposed as the top or wear surface of the article. A series of suction cups 26 and surface drainage holes 28, arranged in any suitable pattern complete the essential structural elements.

Figure 5:
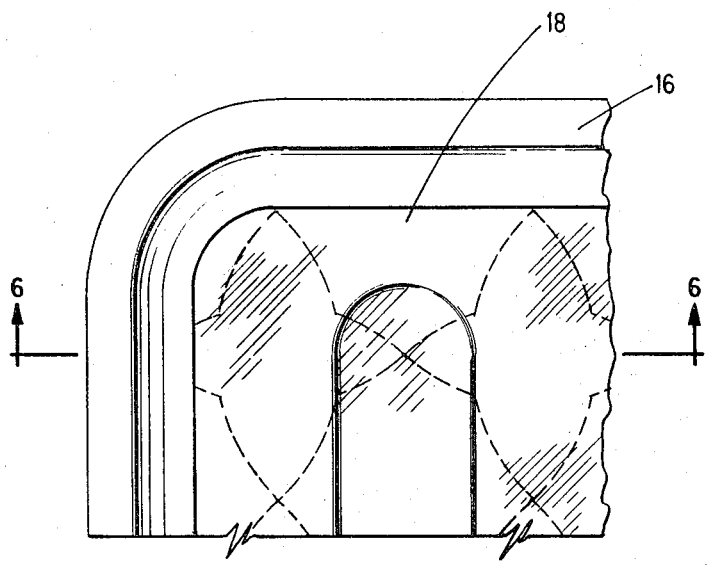
FIG. 5 is a diagrammatic partial plan view of a molded house-wares article in mat-like form, specifically a drainboard, made in accordance with the present invention, wherein a clear poly(vinyl chloride) film is "reverse" printed on one surface, and the printed surface is bonded to the main body of the poly(vinyl chloride) of the form.
Figure 6:
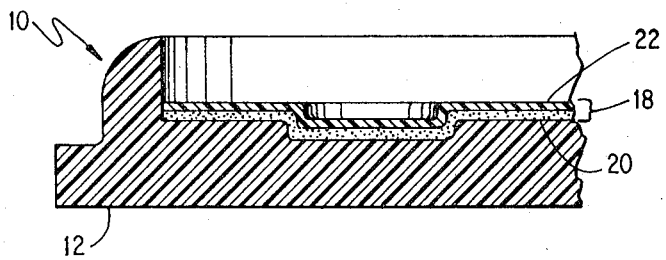
FIG. 6 is a vertical cross-section of the article of FIG. 5, taken along the lines 6—6 of FIG. 5, also exaggerated for clarity.

Conversely, as shown in FIGS. 5 and 6, an article such as a drainboard mat may be made in accordance with the present invention, in which mat a "reverse" printed clear poly(vinyl chloride) film 18, i.e., the desired printed image 20 is exposed through the film in the "see through" fashion, is pressed into the main body of the article (which may contain opacifying and coloring pigments), with the printed image 20 adjacent the in-use upper surface of the article, and the unprinted surface 22 of the film 18 forms the wear surface.

It will be appreciated by those skilled in the art that the important factors in the method of the present invention, and the products resulting therefrom, are that the printed decorative design is preserved in its original form and is not subjected to operations which would distort or mar the design before, or during, in-use service, and that the hot-press molding of the poly(vinyl chloride) laminate articles assures as nearly as practicable a perfect bonding of the members.

The following specific example may be taken as illustrative of the components and method of manufacture of the clear highly plasticized poly(vinyl chloride) used for making of the article of FIGS. 1 and 2:

|  | Parts by weight |
|---|---|
| Poly(vinyl chloride) | 50–60 |
| Plastimizing agent (e.g. di-octylphthalate) | 30–35 |
| Primary stabilizer (e.g., Ba/Cd organic complex) | 1–2 |
| Secondary stabilizer (e.g. epoxidized drying oil) | 1–2 |
| Lubricant (e.g. alkaline earth, Zn or Cd stearate) | 0.25–0.5 |
| Coloring agents (if any) as required for tinting. | |

The components are dry blended and placed in a heated extrusion mill and extruded as a soft to semi-solid cylindrical mass and cut to suitable lengths (referred to as "pigs") for insertion into a cavity mold.

If the highly plasticized poly(vinyl chloride) is to be opaque then the desired opacifying fillers and pigments are added to give the desired degree of opacity as well as color.

As an example of such a composition is the following:

|  | Parts by weight |
|---|---|
| Poly(vinyl chloride) | 100 |
| Plasticizer (e.g. di-octylphthalate or liquid chlorinated paraffins) | 60 |
| Primary stabilizer (as above) | 2 |
| Secondary stabilizer (as above) | 3 |
| Fillers | 150 |
| Lubricant (as above) | 0.25–1 |
| Pigment to provide color as required. | |

Again, the materials are dry blended, placed in a heated extruder and extruded as a soft to semi-solid cylindrical mass cut into suitable lengths for placing in a cavity mold of the desired form.

The printed film employed in accordance with the present invention is preferably one having a thickness of about 6–12 mills which may be either transparent or contain coloring dyes or pigmenting materials to provide a colored transparent, or translucent to opaque, film also preferably of a relatively high poly(vinyl chloride) content, with a lesser amount of plasticizer, i.e., in the range of 5–20% by weight.

It will be understood that generally the printed pattern on the poly(vinyl chloride) film is made up of a colored suspension of pigments and/or dyes in a solution of suitable polymer which is compatible with the poly(vinyl chloride) and has a high degree of affinity therefor, so that separation of the ink, or distortion of the image, during the pressing of the film into the main body of the highly plasticized poly(vinyl chloride) does not occur. In this regard such inks are generally made of a solution or suspension of organic coloring agents together with inorganic pigments or filler materials in a suitable solvent and/or plasticizer of a compatible vinyl resin, such as poly(vinyl chloride) itself. The method of manufacturing such printing inks as well as their application to the poly(vinyl chloride) film in the printing operation, of course, form no part of the present invention, but are well understood by those skilled in the plastics laminating art.

In manufacturing the articles of the present invention the suitably sized masses of the highly plasticized poly(vinyl chloride) are placed in a suitable cavity mold preferably having a pair of separable, heated, cavity-forming mold members, the temperature dwell-time, and pressure applied being sufficient to heat the mass to a flowable, semi-solid state and to fill the cavity of the mold, the temperature of the mold members being of the order of 250°–300° F., and the dwell-time being 5 or more minutes depending upon the size of the molded article, its thickness, and the amount of poly(vinyl chloride) placed in the mold.

The pressure during the molding operation preferably is of the order of 50 to few hundred pounds per square inch, again dependent upon the degree to which the material is plasticized and the amount thereof placed in the cavity mold. A function of the molding temperature is one of heating the highly plasticized poly(vinyl chloride) sufficiently to allow ready flow of the material, and a function of the pressure employed is to force the plasticized poly(vinyl chloride) into all recesses of the mold and shape the article in as short a time as possible for efficient commercial operation.

After the main body of the laminated article has been formed under heat and pressure as described, the molded mass is cooled in the mold, e.g., by passing cooling water at 60°–100° F., through circulation passages in the cavity-forming members. The pressure upon the thus molded article is next released by withdrawing one of the cavity-forming members and retaining the cooled molded mass within the second of the cavity forming members.

Next, the first critical step in the process of the present invention resides in applying to the exposed surface of the molded mass, while the mass is retained in the second cavity-forming member, a printed film of poly(vinyl chloride) preferably of lesser plasticizer content than the main body of the molded article, the application of the printed film being carried out in such a fashion that the printed surface of the film will ultimately be visible as the decorative element of the laminated body. This is accomplished as hereinabove described both for an article made up of a principal layer of highly plasticized clear poly(vinyl chloride), and an opaque body of highly plasticized poly(vinyl chloride), in the first instance either by applying the printed surface of the film to that surface of the molded article which ultimately will be facing or opposite the working surface, or by applying a "reverse" printed poly(vinyl chloride) film to the working surface of the article with the printed side "down," or in contact with the main body of the article, and in the second instance (the opaque, pigmented or filled mass) by applying either the printed or unprinted surface of the film to the working surface of the main body of the article so that the printed surface, or the unprinted surface, of the film then becomes the "wear" surface in "in use" service.

Immediately after the printed poly(vinyl chloride) film has been applied to the molded mass as above-described the second critical step comes into play and the withdrawn cavity-forming member is replaced upon the film, and heat and pressure are applied again to the film and the molded mass while they are retained in the cavity-forming mold, the temperature and pressure being sufficient to press the film into surface of the molded mass and firmly bond the film thereto, such temperatures and pressures being preferably of the order of magnitude of those first used in forming the molded layer prior to laminating the film thereon.

Thereafter the molded laminated article is cooled again while still retained within the mold under pressure, the temperature of the cavity-forming members preferably being such as to be well below that at which the film is pressed in to the surface of the molded mass, such, for example, as within the range of 60°–120° F., at the surface of the molded article so that it is readily handled without losing its general shape or form upon removing the molded laminate from the mold. Following this operation the molded article may be trimmed to the desired size such as by cutting away any "flash" resulting in the molding operation.

It is to be understood that although the invention has been described with specific reference to particular embodiments thereof, it is not to be so limited, since changes and alterations therein may be made which are within the full intended scope of this invention as defined by the appended claims.

I claim:

1. The method of making a decorative, hot-pressed molded, contoured body of poly(vinyl chloride) in mat-like form, including the sequential steps of:

hot-press molding a mass of highly plasticized poly(vinyl chloride) in a cavity mold having a pair of separable, heated cavity forming members, the temperature, dwell time, and pressure during said molding being sufficient to heat said mass to a flowable, semi-solid state and to fill the cavity of said mold, releasing the pressure upon said mass by withdrawing one of said cavity-forming members and retaining the mold mass within the second of said cavity forming members, and while said mass is retained in the second cavity-forming member, placing on the exposed surface of said molded mass, a printed film of poly(vinyl chloride) of lesser plasticizer content than said molded mass in such a manner that the printed surface of said film is ultimately visible as the decorative element of said body, replacing the withdrawn cavity-forming member upon said film, applying heat and pressure to the film and molded mass while in said cavity-forming mold at a temperature and pressure sufficient to shape said film and press said film into the surface of said molded mass and firmly bond said film thereto, cooling the thus-formed laminated body in said mold to a temperature below that at which said film is pressed into the surface of said mass, and removing the thus formed body from said mold.

2. The method of claim 1 in which the withdrawn cavity-forming member forms in working surface of said mat-like form, and the printed side of a "reverse" printed poly(vinyl chloride) film is applied to said working surface of said molded mass.

3. The method of claim 1 in which the mass of highly plasticized poly(vinyl chloride) opacifying pigments and fillers are absent and the withdrawn cavity-forming member forms the surface of said body opposite the wear surface of said mat-like form, and the printed side of said film is applied to said exposed surface of said molded mass.

4. The method of claim 1 in which the mass of highly plasticized poly(vinyl chloride) contains opacifying fillers and pigments, the withdrawn cavity-forming member forms the working surface of said mat-like form, and the unprinted side of said film is applied to said working surface of said molded mass.

5. The method of claim 3 in which the withdrawn cavity-forming member forms a generally planar surface, and the second cavity-forming member forms an uneven contoured working surface of said mat-like form.

6. The method of claim 4 in which the second cavity-forming member forms a series of suction cup-like protuberances on one surface of said mat-like form, and said withdrawn cavity-forming member forms the working surface which is generally planar.

References Cited

UNITED STATES PATENTS

| | | | |
|---|---|---|---|
| 3,379,592 | 4/1968 | Ostrowicz | 156—245X |
| 3,419,455 | 12/1968 | Roberts | 156—245X |
| 3,420,733 | 1/1969 | Ochi | 156—245X |

BENJAMIN R. PADGETT, Primary Examiner

S. J. LECHERT, Jr., Assistant Examiner

U.S. Cl. X.R.

156—242, 245, 306; 161—68